(12) United States Patent
Tanami et al.

(10) Patent No.: US 10,911,631 B2
(45) Date of Patent: *Feb. 2, 2021

(54) ELECTRIC APPARATUS AND CONTROL METHOD FOR CONTROLLING MOVEMENT OF TARGET OBJECT

(71) Applicant: CANON KABUSHIKI KAISHA, Tokyo (JP)

(72) Inventors: Haruhiko Tanami, Fuchu (JP); Yuichiro Suzuki, Yokohama (JP); Isao Iwai, Saitama (JP); Kota Kiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,594

(22) Filed: Apr. 22, 2019

(65) Prior Publication Data
US 2019/0335056 A1 Oct. 31, 2019

(30) Foreign Application Priority Data
Apr. 27, 2018 (JP) .................. 2018-087540

(51) Int. Cl.
*B41J 19/20* (2006.01)
*B41J 29/38* (2006.01)
(Continued)

(52) U.S. Cl.
CPC ............. *H04N 1/1035* (2013.01); *B41J 2/07* (2013.01); *G02B 26/10* (2013.01); *H04N 1/00798* (2013.01)

(58) Field of Classification Search
CPC ..... H04N 1/1035; H04N 1/00798; B41J 2/07; B41J 19/205; B41J 19/207; B41J 25/006; B41J 19/202; G02B 26/10; H02P 6/10
See application file for complete search history.

(56) References Cited

U.S. PATENT DOCUMENTS

| 6,157,599 A | 12/2000 | Yamashita et al. |
| 8,573,727 B2 | 11/2013 | Iwai |

(Continued)

FOREIGN PATENT DOCUMENTS

JP 2011-102012 A 5/2011

OTHER PUBLICATIONS

U.S. Appl. No. 16/386,581, Isao Iwai Kota Kiyama Haruhiko Tanami Yuichiro Suzuki, filed Apr. 17, 2019.

(Continued)

*Primary Examiner* — Juan M Guillermety
(74) *Attorney, Agent, or Firm* — Venable LLP

(57) ABSTRACT

An apparatus detects movement of a target object, estimates a control quantity for first feedback control for the target object at a first period based on a detection signal, estimates a first state quantity of the target object and a second state quantity obtained by time differentiation of the first state quantity for second feedback control for the target object at a second period, shorter than the first period, based on the detection signal, generates a first operation quantity for the first feedback control based on the control quantity, generates a second operation quantity for the second feedback control based on the first and second state quantities, determines a sign of the second operation quantity from a relationship between the first and second state quantities, and generates an operation quantity on the target object from the first and second operation quantities.

12 Claims, 6 Drawing Sheets

(51) Int. Cl.
*H04N 1/00* (2006.01)
*H04N 1/10* (2006.01)
*G02B 26/10* (2006.01)
*B41J 2/07* (2006.01)

(56) References Cited

U.S. PATENT DOCUMENTS

| | | | |
|---|---|---|---|
| 9,621,082 B2 | 4/2017 | Tanami | |
| 2003/0178958 A1* | 9/2003 | Akiyama | H02P 1/22 318/280 |
| 2004/0119778 A1* | 6/2004 | Naito | B41J 19/202 347/37 |
| 2006/0008310 A1 | 1/2006 | Morikawa et al. | |
| 2006/0127156 A1* | 6/2006 | Takahashi | B41J 19/04 400/303 |
| 2006/0268043 A1* | 11/2006 | Akiyama | B41J 19/202 347/19 |
| 2015/0097896 A1* | 4/2015 | Kawafuji | B41J 19/205 347/37 |
| 2015/0314619 A1* | 11/2015 | Tanami | B41J 19/207 347/39 |

OTHER PUBLICATIONS

U.S. Appl. No. 16/390,544, Yuichiro Suzuki Eriko Uchida, filed Apr. 22, 2019.
U.S. Appl. No. 16/390,569, Kota Kiyama Yuichiro Suzuki Isao Iwai Haruhiko Tanami, filed Apr. 22, 2019.

* cited by examiner

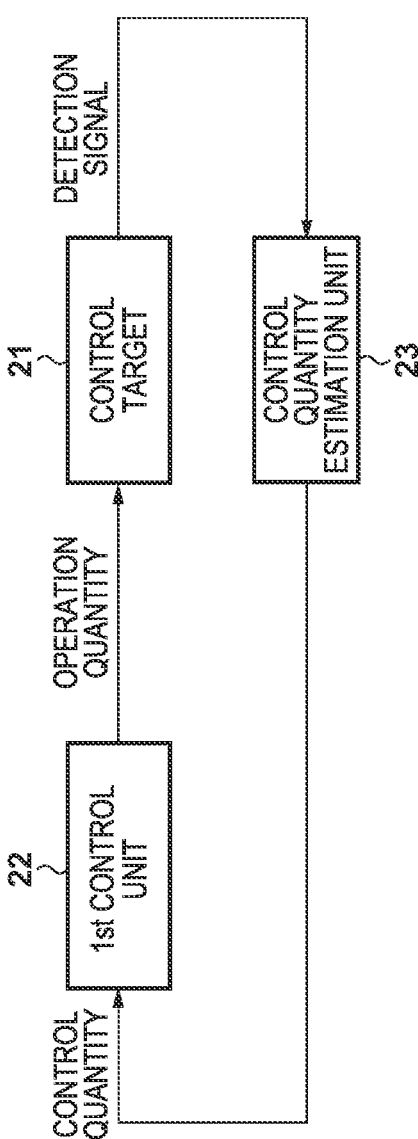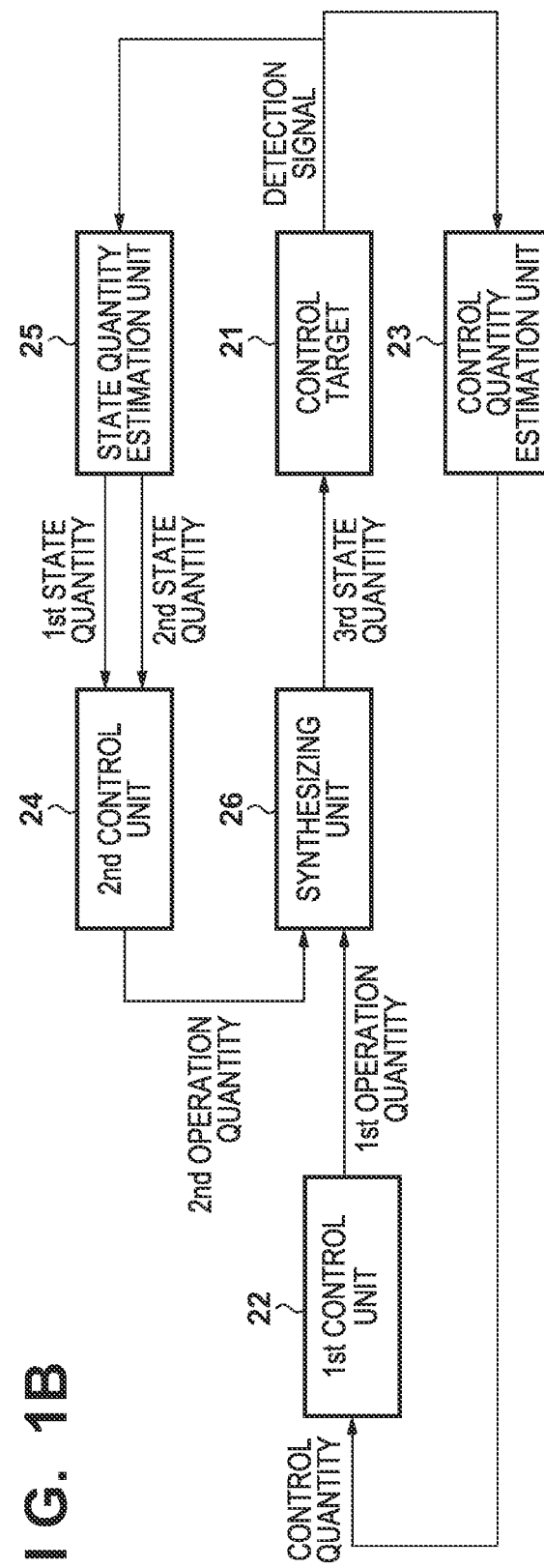

VELOCITY PROFILE

ELECTRIC APPARATUS AND CONTROL METHOD FOR CONTROLLING MOVEMENT OF TARGET OBJECT

BACKGROUND OF THE INVENTION

Field of the Invention

The present invention relates to an electric apparatus and a control method therefor, and particularly to a technique of controlling driving of a moving object such as the carriage of a serial type printing apparatus.

Description of the Related Art

As for driving of a carriage that reciprocally moves by a motor in a serial type printer, feedback control such as PID control using an encoder is common practice. In a serial type inkjet printer, a driving unit that scans a carriage mounted with a printhead for discharging ink emphasizes a velocity vibration at the time of scanning the carriage to stabilize an ink landing position. Thus, it is required to implement control for stabilizing a velocity vibration of the carriage.

In a printing apparatus and a gain correction method described in Japanese Patent Laid-Open No. 2011-102012, a constant (gain) for PID control is corrected in accordance with a correction ratio based on a velocity vibration quantity for a predetermined period during which a specific control target is operated. According to Japanese Patent Laid-Open No. 2011-102012, as the velocity vibration quantity is larger, the correction ratio for PID control can be made smaller. As a result, an excessive vibration is suppressed, thereby making it possible to implement convergence of the velocity vibration of the control target.

In the printing apparatus and the gain correction method described in Japanese Patent Laid-Open No. 2011-102012, to converge the velocity vibration of the control target, the control gain of the control target is decreased resultantly. Therefore, although it is possible to suppress an excessive vibration of a control target object, the responsiveness of the control target object may be spoiled. That is, compatibility between traceability and vibration suppression in a change in state of the control target object may become an issue.

SUMMARY OF THE INVENTION

Accordingly, the present invention is conceived as a response to the above-described disadvantages of the conventional art.

For example, an electric apparatus and a control method therefor according to this invention are capable of achieving compatibility between traceability of feedback control and vibration suppression of a control target object.

According to one aspect of the present invention, there is provided an electric apparatus for controlling movement of a target object, comprising: a detection unit configured to detect the movement of the target object; a first estimation unit configured to estimate, based on a detection signal output from the detection unit, a control quantity for performing first feedback control for the target object at a first period; a second estimation unit configured to estimate, based on the detection signal output from the detection unit, a first state quantity of the target object and a second state quantity obtained by time differentiation of the first state quantity in order to perform second feedback control for the target object at a second period shorter than the first period; a first generation unit configured to generate a first operation quantity for the first feedback control based on the control quantity estimated by the first estimation unit; a second generation unit configured to generate a second operation quantity for the second feedback control based on the first state quantity and the second state quantity estimated by the second estimation unit, and determine a sign of the second operation quantity from a relationship between the first state quantity and the second state quantity; and a synthesizing unit configured to generate an operation quantity on the target object from the first operation quantity and the second operation quantity.

According to another aspect of the present invention, there is provided a control method for an electric apparatus for controlling movement of a target object, comprising: detecting the movement of the target object; estimating, based on a detection signal acquired in the detecting, a control quantity for performing first feedback control for the target object at a first period; estimating, based on the detection signal acquired in the detecting, a first state quantity of the target object and a second state quantity obtained by time differentiation of the first state quantity in order to perform second feedback control for the target object at a second period shorter than the first period; generating a first operation quantity for the first feedback control based on the estimated control quantity; generating a second operation quantity for the second feedback control based on the estimated first state quantity and the estimated second state quantity, and determining a sign of the second operation quantity from a relationship between the first state quantity and the second state quantity; and generating an operation quantity on the target object from the first operation quantity and the second operation quantity.

The invention is particularly advantageous since it is possible to achieve compatibility between traceability of feedback control and vibration suppression of a control target object.

Further features of the present invention will become apparent from the following description of exemplary embodiments (with reference to the attached drawings).

BRIEF DESCRIPTION OF THE DRAWINGS

FIGS. 1A and 1B are block diagrams each showing a feedback control arrangement in a driving control unit of a carriage motor of a printing apparatus;

DESCRIPTION OF THE EMBODIMENTS

Figure 2:
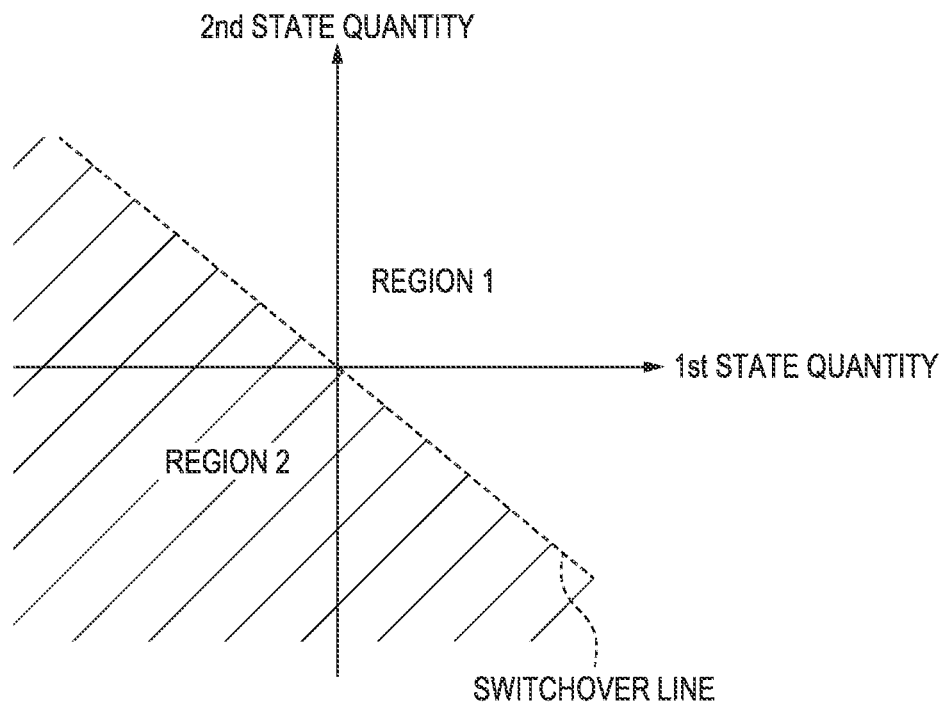
FIG. 2 is a view showing a two-dimensional coordinate space representing the relationship between the first and the second state quantities.

Exemplary embodiments of the present invention will now be described in detail in accordance with the accompanying drawings.

In the following description, control of driving of a motor that moves a carriage of a serial type printing apparatus as an exemplary example of an electric apparatus will be exemplified. However, the present invention is not limited to the carriage of the printing apparatus, and motor control according to the present invention is applicable to any unit that moves an object by driving a motor. For example, in the printing apparatus, motor control is applicable to control of driving of a conveyance motor used to convey a print medium such as a print sheet. The present invention also includes a scanner apparatus that optically reads an image of an original while moving a CCD line scanner or CIS by driving a motor.

1. Explanation of Feedback Control

FIGS. 1A and 1B are block diagrams each showing a feedback control arrangement in a driving control unit of a carriage motor of a printing apparatus. FIG. 1A is a block diagram showing a general control arrangement. FIG. 1B is a block diagram showing a control arrangement used in this embodiment.

First, the general feedback control arrangement will be described with reference to FIG. 1A.

As shown in FIG. 1A, a detection signal (the position and velocity of a carriage) that detects the state of a control target (for example, a carriage) 21 is output to a control quantity estimation unit (for example, a CPU) 23 to estimate the control quantity of position/velocity information or the like. The control quantity is output to a first control unit (for example, a carriage driver) 22 to calculate an operation quantity for converging the control target 21 to a target value. When the operation quantity is output to the control target 21, a feedback control loop is formed.

To stably move the control target, it is necessary to set various parameters while ensuring an allowance in terms of control in consideration of the characteristic of the control target. If the allowance is insufficient, a vibration occurs, and an oscillation phenomenon may lead to an uncontrollable state. On the other hand, if the allowance is too large, the traceability performance of the control target deteriorates but it is unavoidable to impose a restriction on the traceability performance for vibration suppression.

Next, the feedback control arrangement used in this embodiment will be described with reference to FIG. 1B.

As shown in FIG. 1B, in feedback control, in addition to the feedback control loop shown in FIG. 1A, another feedback control loop using the detection signal from the control target 21 is formed. That is, the detection signal that detects the state of the control target 21 is output to the control quantity estimation unit 23 to estimate the control quantity of the position/velocity information of the carriage or the like. The control quantity is output to the first control unit 22, and the first control unit 22 calculates the first operation quantity for converging the control target 21 to the target value. Then, the first control unit 22 outputs the first operation quantity to the control target 21 via the synthesizing unit 26, thereby forming the first feedback loop.

On the other hand, the detection signal that detects the state of the control target 21 is also output to a state quantity estimation unit 25, and the state quantity estimation unit 25 estimates the first and second state quantities. The second state quantity is obtained by the time differentiation of the first state quantity. More specifically, the first and second state quantities are values formed from a combination of a position and a velocity or a combination of a velocity and an acceleration. These values are output to a second control unit 24. The second control unit 24 calculates the second operation quantity. Next, the second control unit 24 outputs the second operation quantity, and a synthesizing unit 26 synthesizes the first and second operation quantities, and outputs a synthesizing result to the control target 21. The second feedback loop "control target 21→state quantity estimation unit 25→second control unit 24→synthesizing unit 26→control target 21" is formed.

Since the first and second state quantities have the relationship between, for example, the position (x) and velocity (v) of the carriage or between the velocity (v) and acceleration (a) of the carriage, the relationship between the two state quantities (two variables) can be represented by a two-dimensional space.

FIG. 2 is a view showing a two-dimensional coordinate space representing the relationship between the first and second state quantities. Referring to FIG. 2, the abscissa defines the first state quantity and the ordinate defines the second state quantity.

As shown in FIG. 2, two divided regions are defined in advance on the plane, and the plane is divided into two regions by a function called a switchover line. These divided regions will be referred to as regions 1 and 2 hereinafter. The function representing the switchover line is a linear function represented by a relationship "S2=k×S1" where S1 represents the first state quantity and S2 represents the second state quantity. Note that k represents a switchover coefficient.

As shown in FIG. 2, with respect to the switchover line, an upper region (white) is region 1 and a lower region (hatched) is region 2. If there is the relationship between the first and second state quantities in region 1, a positive operation quantity is output. If there is the relationship between the first and second state quantities in region 2, a negative operation quantity is output. Note that in accordance with an operation condition, a negative sign may be assigned to region 1 and a positive sign may be assigned to region 2. When the sign is switched over every time the two regions are crossed, the operation quantity implements movement corresponding to a switching operation. The second control unit 24 outputs such operation quantity as the second operation quantity to the control target 21 via the synthesizing unit 26.

The first and second operation quantities are updated asynchronously. The synthesizing unit 26 adds the quantities while adjusting the update timings, and outputs an added value as the third operation quantity to the control target 21.

An example in which the feedback control shown in FIG. 1B is applied to control of the velocity of the carriage that reciprocates while being mounted with a printhead in the serial type printing apparatus will now be described.

Figure 3:
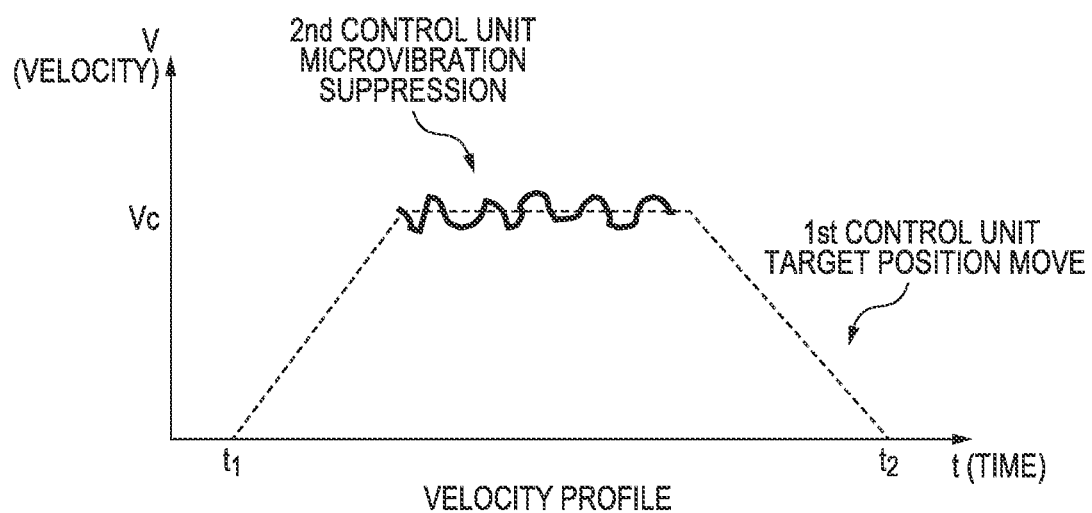
FIG. 3 is a timing chart showing a velocity profile of a carriage as a control target.

FIG. 3 is a timing chart showing the velocity profile of the carriage as the control target.

Referring to FIG. 3, the abscissa represents time (t) and the ordinate represents the velocity (v) of the carriage. FIG. 3 shows the velocity profile in which the carriage starts to move from a home position at $t=t_1$, accelerates to reach a velocity $v_c$, transitions to constant movement, and then decelerates to stop at $t=t_2$. However, the actual carriage motion is not ideal, and the velocity of the carriage micro-vibrates due to the influence of an external disturbance or the like during constant movement. The micro-vibration of the velocity indicates the occurrence of positive and negative accelerations at a very short period.

In FIG. 3, the ideal velocity profile is indicated by a broken line and a micro-velocity vibration during constant movement is indicated by a thick solid line.

In the feedback control according to this embodiment, the first control unit 22 is responsible for control of the velocity profile indicated by the broken line, and moves the carriage as control target to a target position in accordance with a desired acceleration condition and velocity condition. The first control unit 22 executes PID control calculation generally widely used, sets various parameters in consideration of an allowance in terms of control, determines a control band, and then implements desired movement while suppressing a vibration in the control band.

On the other hand, the second control unit 24 is responsible for control of suppressing a micro-velocity vibration indicated by the thick solid line. The second control unit 24 suppresses a vibration phenomenon (velocity vibration) in a high-frequency band exceeding the control band of the first control unit 22. To suppress such velocity vibration, it is necessary to perform, at a short period corresponding to the period of the velocity vibration, an operation of giving a positive acceleration as an operation quantity for a negative acceleration that occurs while giving a negative acceleration as an operation quantity for a positive acceleration that occurs. Therefore, since a sufficiently short control period is required to implement the control performance, the second control unit 24 executes control at a control period at least shorter than that of the first control unit 22.

When the control period is sufficiently short, the second control unit 24 can implement a high-speed switching operation, and can perform vibration suppression (velocity vibration suppression) up to a region exceeding the control band of the first control unit 22. Therefore, even if the state of the carriage as the control target changes and a vibration phenomenon occurs when only feedback control by the first control unit 22 is performed, the second control unit 24 can suppress a vibration to build a stable control system without spoiling the traceability.

In summary, the role of the first control unit 22 that performs the conventional feedback control is to converge, to the target position, the carriage as the control target having the velocity profile formed from acceleration, a constant velocity, and deceleration. The first control unit 22 forms a feedback loop (first feedback loop) by PID control using the control quantity formed from the position and velocity information of the carriage. On the other hand, the role of the second control unit 24 is to suppress a micro-velocity vibration of the carriage that cannot be controlled by the first control unit 22. The second control unit 24 forms a feedback loop (second feedback loop) by high-speed switching control using a state quantity formed from a combination of a position and a velocity or a velocity and an acceleration. Therefore, control of the second feedback loop is executed at a calculation period shorter than that of the first feedback loop.

Figure 4:
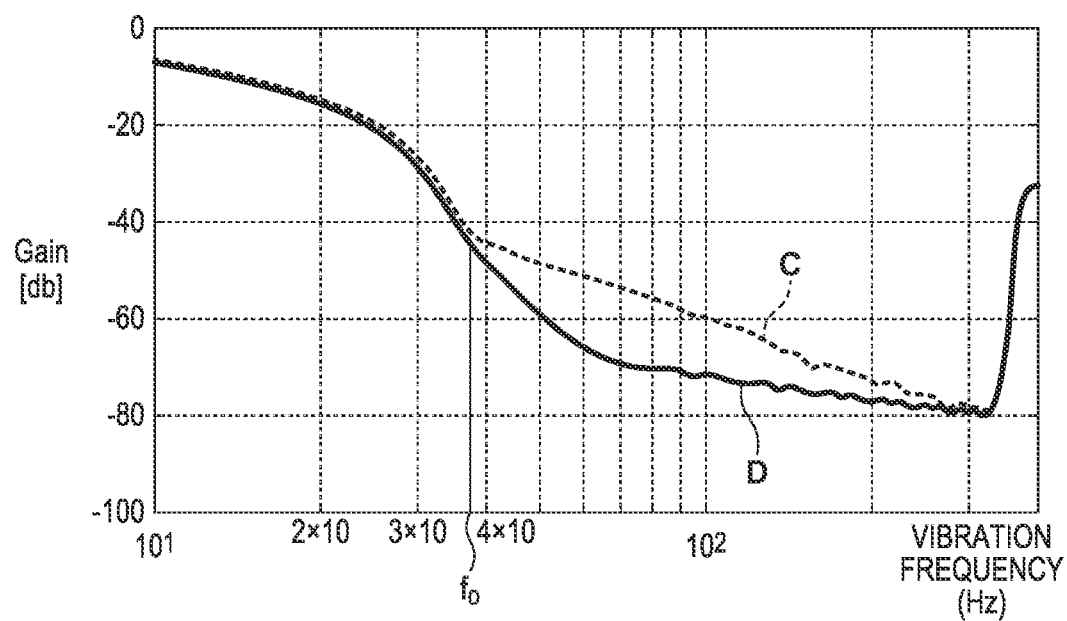
FIG. 4 is a graph showing a transfer function when the feedback control arrangement is applied to the driving control unit of the carriage motor.

FIG. 4 is a graph showing a transfer function in a case where the above-described control arrangement is applied to the driving control unit of the carriage motor. The transfer function outputs a velocity vibration suppression gain obtained when an external disturbance is given to the carriage as the control target. Referring to FIG. 4, the ordinate represents a gain (db) as a transfer ratio and the abscissa represents a frequency (Hz).

Referring to FIG. 4, curve C indicated by a broken line represents a characteristic obtained when only the first control unit 22 is operated. On the other hand, curve D indicated by a thick solid line represents a characteristic obtained when both the first control unit 22 and the second control unit 24 are operated and the synthesizing unit 26 generates the third operation quantity. As is apparent by comparing curves C and D, curve D indicates a small value in a frequency region where the frequency is higher than a frequency $f_0$, which indicates that the external disturbance suppression effect is high. The frequency $f_0$ roughly indicates the control band of the first control unit 22. Therefore, by operating the second control unit 24 together with the first control unit 22, a vibration suppression effect is produced in a frequency band (35 Hz to 300 Hz) higher than the control band of the first control unit 22.

2. Explanation of Application Example of Feedback Control

A serial type printing apparatus to which control of forming the two feedback loops explained with reference to FIG. 1B is applied will be described.

<Explanation of Printing Apparatus (FIGS. 5 and 6)>

Figure 5:
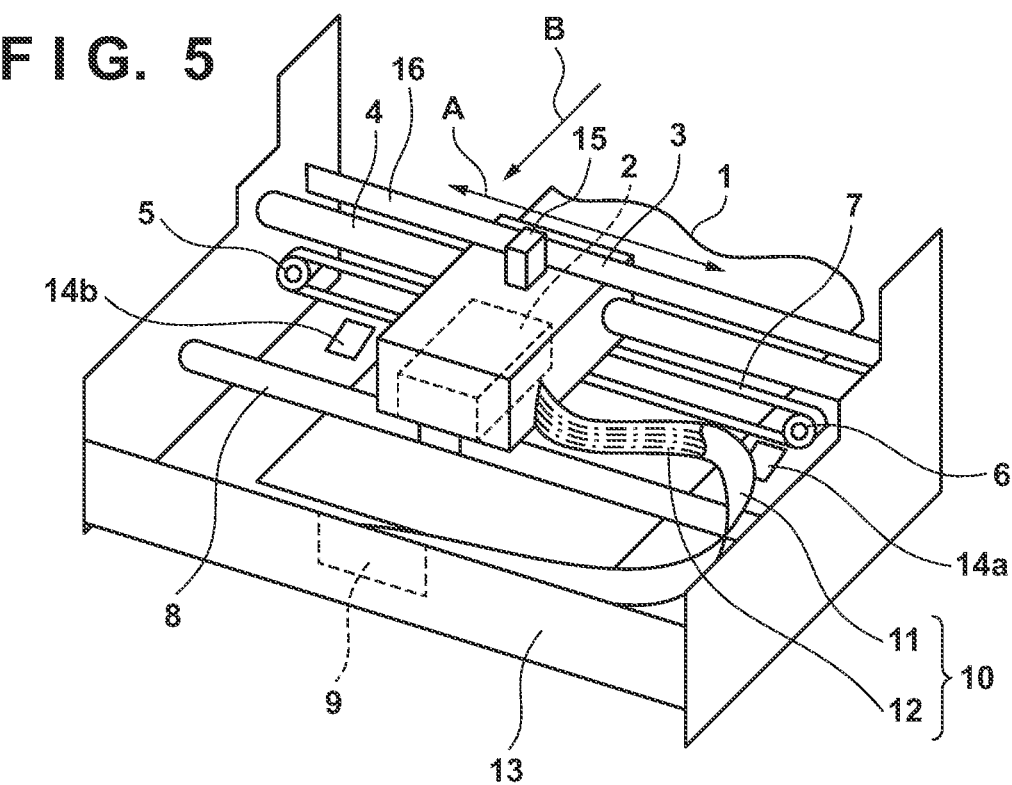
FIG. 5 is a perspective view showing the main mechanism part of an inkjet printing apparatus according to an exemplary embodiment of the present invention.

FIG. 5 is an external perspective view showing the arrangement of the printing apparatus mounted with an inkjet printhead (to be referred to as a printhead hereinafter) that discharges ink droplets in accordance with an inkjet method, according to the exemplary embodiment of the present invention.

A carriage (moving object) 3 mounted with a printhead 2 is supported slidably by a guide shaft 4, and reciprocally moves above a print medium (sheet) 1. A carriage motor (DC motor) 5 with a pulley is arranged at one end of the moving range of the carriage 3, an idle pulley 6 is arranged at the other end, and a timing belt 7 is looped between the carriage motor 5 and the idle pulley 6, thereby connecting the carriage 3 to the timing belt 7.

To prevent the carriage 3 from rotating about the guide shaft 4, a support member 8 installed to extend in parallel to the guide shaft 4 is installed, and the carriage 3 is also supported slidably by the support member 8. In the printhead 2, a number of print elements are provided and an FFC (Flexible Flat Cable) 11 for supplying the driving signals of the print elements from the main body portion of the printing apparatus to the printhead 2 is arranged. The FFC 11 has a long thin film shape, a conductive pattern for transmitting a driving signal is formed in the inside or surface of the FFC 11, and the FFC 11 has flexibility so that it bends along with the movement of the carriage 3 to move the central position of bending.

Furthermore, an ink tank (not shown) is arranged outside the carriage 3, and a tube 12 that supplies, to the printhead 2, ink contained in the ink tank is provided. The tube 12 has flexibility so that it bends along with the movement of the carriage 3 to move the central position of bending. A connecting member 10 formed from the FFC 11 and the tube 12 is connected between the carriage 3 and a fixing portion 9 of the main body 13 of the printing apparatus.

Furthermore, a linear scale 16 that is used to acquire the position information of the carriage 3 is arranged in parallel to the moving direction (main scanning direction) of the carriage, and is configured to be read by an encoder sensor 15 attached to the carriage 3. Ink collection ports 14a and 14b for collecting ink preliminarily discharged by the printhead 2 are provided on both the outsides in the width direction of the print medium 1. The preliminary discharge indicates an operation for discharging, at positions irrelevant to printing, ink adhered to the distal end portions of nozzles immediately before the start of printing or during execution of printing.

With this arrangement, the carriage 3 reciprocally moves in a direction (main scanning direction) of an arrow A. The print medium 1 is conveyed by a conveyance motor (not shown) in a direction (sub-scanning direction) of an arrow B vertically intersecting the carriage 3.

Figure 6:
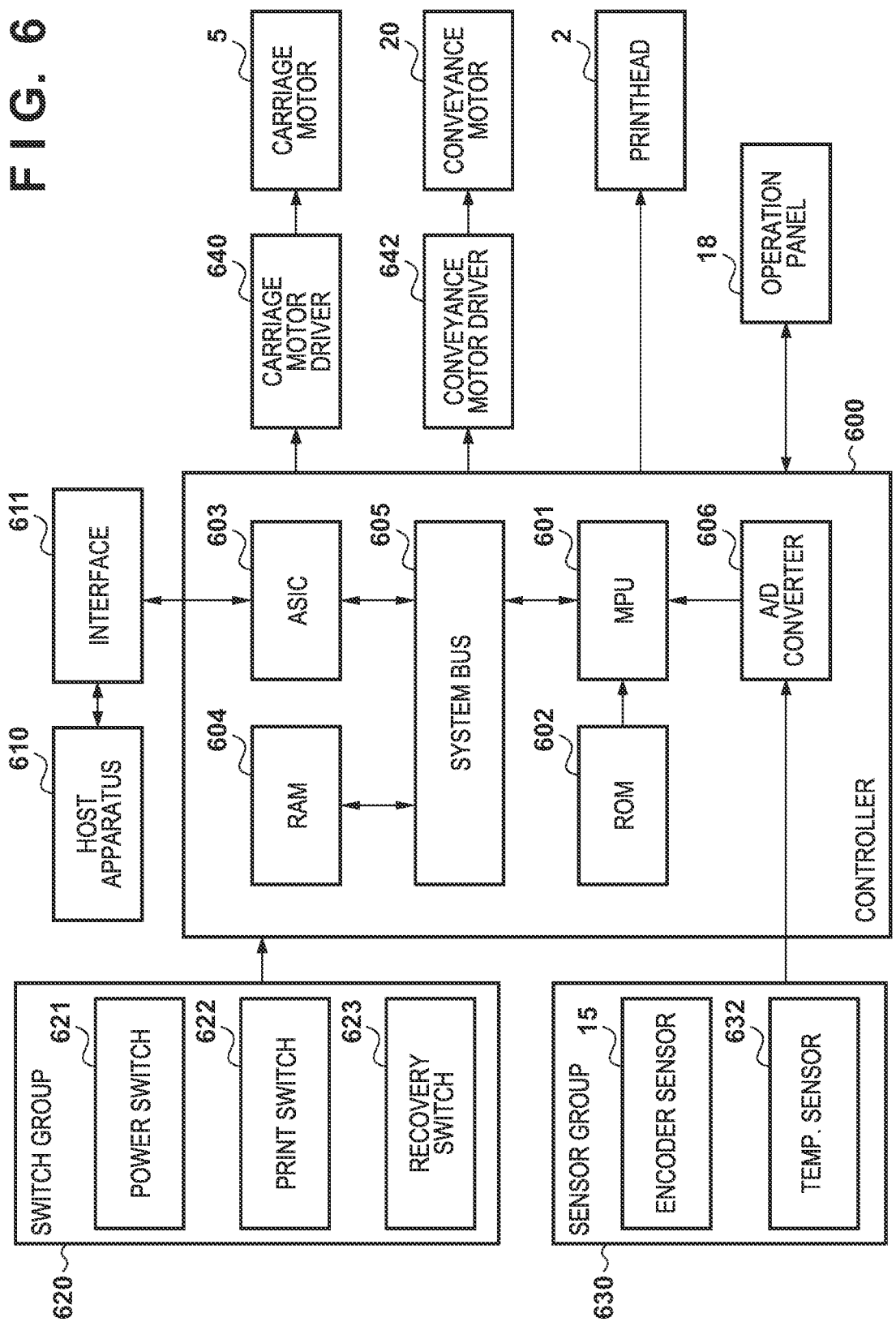
FIG. 6 is a block diagram showing an overview of the control arrangement of the printing apparatus shown in FIG. 5.

FIG. 6 is a block diagram showing the control arrangement of the printing apparatus shown in FIG. 5.

As shown in FIG. 6, a controller 600 is formed by an MPU 601, a ROM 602, an ASIC (Application Specific Integrated Circuit) 603, a RAM 604, a system bus 605, an A/D converter 606, and the like. The ROM 602 stores a program corresponding to a control sequence (to be described later), a required table, and other fixed data.

The ASIC 603 generates control signals for controlling the carriage motor 5, a conveyance motor 20, and the printhead 2. The RAM 604 is used as a loading area of image data, a work area for executing a program, and the like. The system bus 605 interconnects the MPU 601, the ASIC 603, and the RAM 604 to exchange data. The A/D converter 606 receives an analog signal from a sensor group (to be described below), performs A/D conversion, and supplies a digital signal to the MPU 601.

Referring to FIG. 6, reference numeral 610 denotes a host apparatus serving as an image data supply source. Image data, a command, a status, and the like are transmitted/received between the host apparatus 610 and the printing apparatus via an interface (I/F) 611 using, for example, a protocol based on the USB standard.

Furthermore, reference numeral 620 denotes a switch group which is formed from a power switch 621, a print switch 622 used to issue a print start instruction or the like, a recovery switch 623, and the like.

Reference numeral 630 denotes a sensor group for detecting an apparatus status, which is formed from detectors such as the encoder sensor 15, a temperature sensor 632, and the like.

Reference numeral 640 denotes a carriage motor driver that drives the carriage motor 5 for causing the carriage 3 to reciprocally scan in the direction of the arrow A; and 642, a conveyance motor driver that drives the conveyance motor 20 for conveying a print medium P.

At the time of print scanning by the printhead 2, the ASIC 603 transfers data for driving the print elements (heaters for discharge) to the printhead 2 while directly accessing the memory area of the RAM 604. In addition, this printing apparatus includes, as a user interface, an operation panel 18 formed by an LCD or LED. From the viewpoint of apparatus implementation, the switch group 620 may be included in the operation panel 18.

The ASIC 603 operates as a calculation processing unit to perform image processing and actuator control, and executes calculation processing by receiving a command from the MPU 601. Feedback control calculation is partially executed by the ASIC 603, and details thereof will be described later. The MPU 601 is responsible for part of calculation for feedback control of the carriage 3, and executes driving calculation of the carriage motor 5 in accordance with a print sequence. When the host apparatus 610 issues a print command via the interface 611, the carriage 3 reciprocally operates for a print operation.

3. Details of Feedback Control Arrangement for Carriage Control of Printing Apparatus Application of the feedback control arrangement described with reference to FIG. 1B to carriage driving control in the printing apparatus described with reference to FIGS. 5 and 6 will be described in detail.

Figure 7:
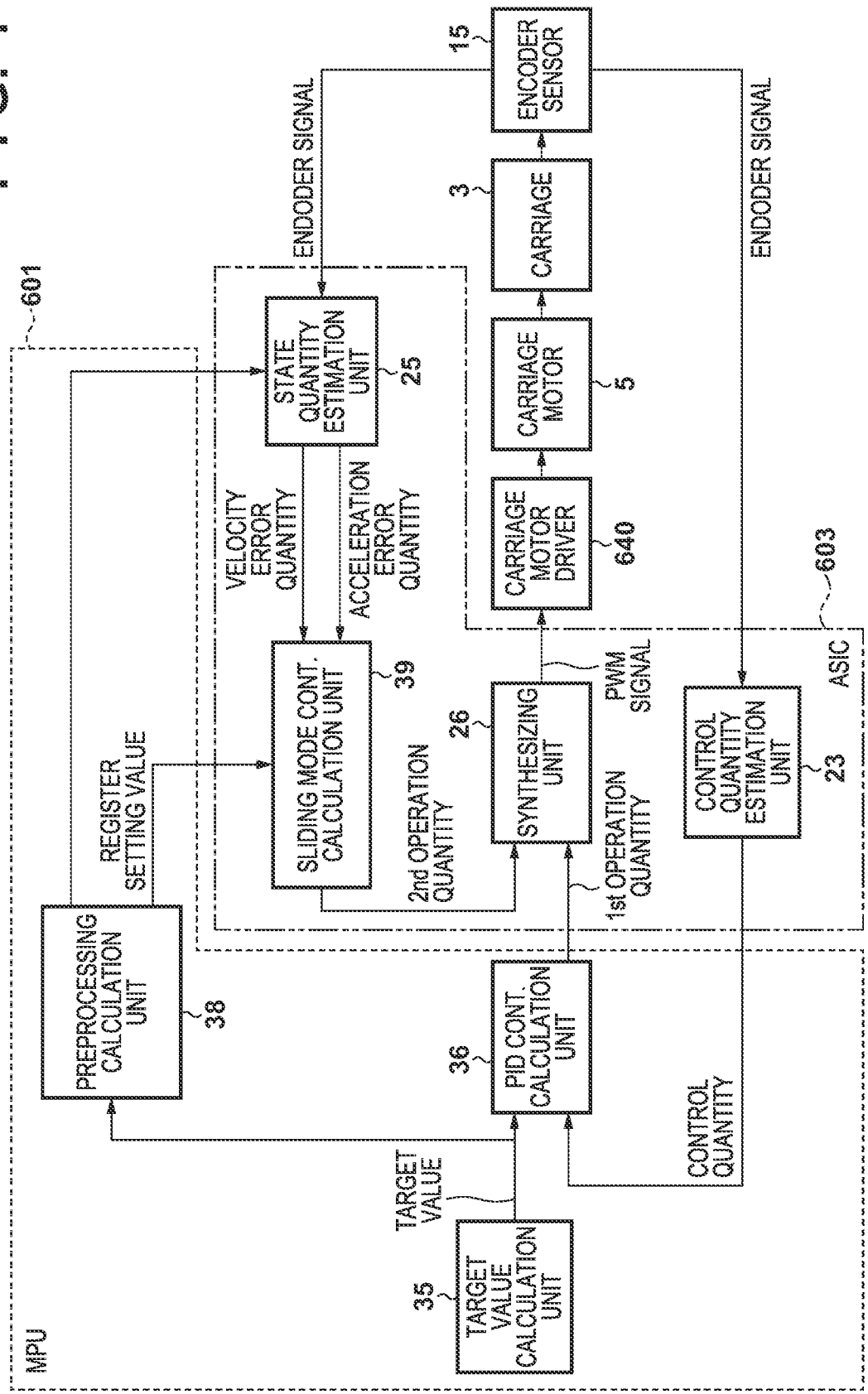
FIG. 7 is a block diagram for explaining details of carriage driving control in the printing apparatus shown in FIGS. 5 and 6.

FIG. 7 is a block diagram for explaining details of carriage driving control in the printing apparatus shown in FIGS. 5 and 6.

Accuracy for causing ink to land at a correct position is required for carriage control of the printing apparatus in order to ensure the print quality by the printhead 2. An ink droplet discharge timing from the printhead 2 is calculated from the moving velocity (v) of the carriage 3, and it is important to minimize a velocity vibration. To achieve this, a vibration target to be suppressed in the feedback control according to this embodiment is the velocity of the carriage. Therefore, the first and second state quantities in the feedback control described with reference to FIG. 1B are formed from a combination of the velocity and acceleration of the carriage 3, and are input to the second control unit 24.

Furthermore, the control target in the feedback control is the carriage 3, and the encoder sensor 15 outputs encoder signals to the control quantity estimation unit 23 and the state quantity estimation unit 25. In general, two A- and B-phase pulse signals whose phases are different from each other by 90° are used as encoder signals. In this embodiment as well, two A- and B-phase pulse signals are used as the encoder signals. Note that an encoder signal from the encoder sensor 15 need not be input to the A/D converter 606.

Figure 8:
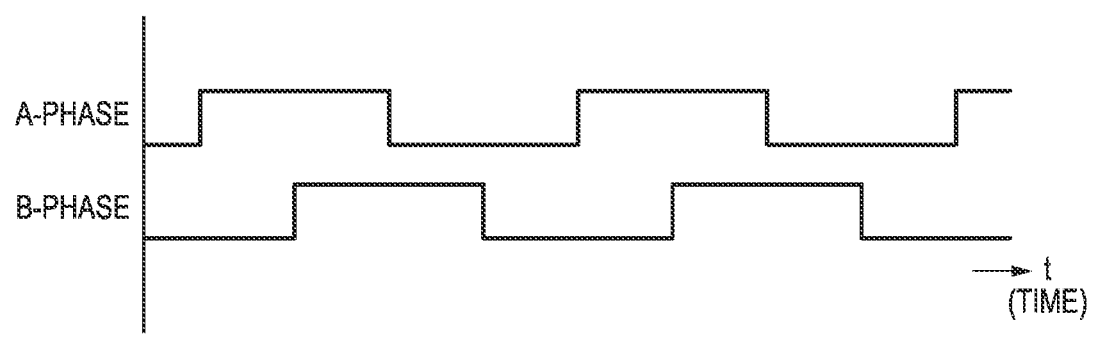
FIG. 8 is a timing chart showing A- and B-phase encoder signals.

FIG. 8 is a timing chart showing the A- and B-phase encoder signals.

The control quantity estimation unit 23 estimates position information by counting the pulse signal, and estimates velocity information by measuring the pulse width of the pulse signal. This position/velocity information or the like is output as a control quantity to a PID control calculation unit 36 corresponding to the first control unit 22.

A target value calculation unit 35 generates a target profile for moving the carriage 3 to a target position in accordance with a desired acceleration condition and velocity condition, and outputs the target profile as a target value. The PID control calculation unit 36 performs PID control calculation using the target value from the target value calculation unit 35 and the control quantity from the control quantity estimation unit 23, and outputs a calculation result as the first operation quantity.

The encoder signal from the encoder sensor 15 is also output to the state quantity estimation unit 25. The state quantity estimation unit 25 also receives a register setting value output from a preprocessing calculation unit 38. The register setting value is a value obtained by replacing, by the preprocessing calculation unit 38, the target value from the target value calculation unit 35 by a value in a unit system used in the state quantity estimation unit 25. The state quantity estimation unit 25 estimates velocity information and acceleration information from the encoder signal, and calculates an error quantity with respect to the register setting value as an operation target. A velocity error quantity and acceleration error quantity as the error quantity are output, as a combination of state quantities in the velocity dimension and acceleration dimension, to a sliding mode control calculation unit 39 corresponding to the second control unit 24.

The sliding mode control calculation unit 39 forms a two-dimensional plane space formed from two variables of the velocity error quantity and the acceleration error quantity. Region determination of the two-dimensional plane described with reference to FIG. 2 is obtained by:

$$S = \text{switchover coefficient} \times \text{acceleration error quantity} + \text{velocity error quantity}$$

If S>0, the current state quantity is located in region 1 as the upper portion with respect to the switchover line. On the other hand, if S<0, the current state quantity is located in region 2 as the lower portion with respect to the switchover line. If S=0, S=0 is defined as S>0 or S<0. The sign of the operation quantity is determined based on the region determination result, and the operation quantity is output as the second operation quantity. Note that the switchover coefficient is updated by the register setting value output from the preprocessing calculation unit 38.

The update timings of the first and second operation quantities will now be described.

The first operation quantity is updated every time the PID control calculation unit 36 is executed. The carriage motor driving control unit (carriage motor driver) of the printing apparatus to which the feedback control shown in FIG. 1B is applied often executes control calculation at a period of about 1 KHz. On the other hand, the second operation quantity is updated every time the sliding mode control calculation unit 39 is executed. A change in pulse of the encoder signal is assumed, and control calculation is executed at a period of about several kHz to 20 kHz. For such inputs having an asynchronous relationship, the synthesizing unit 26 adds them while adjusting the timings. The synthesizing unit 26 outputs a PWM signal based on the addition result of the operation quantities to the carriage motor driver 640. The carriage motor driver 640 rotates the carriage motor 5, and the carriage 3 moves through the timing belt 7.

To implement high-speed calculation derived from a change in pulse of the encoder signal, it is assumed that the sliding mode control calculation unit 39 is executed by hardware such as an ASIC.

Referring to FIG. 7, a range surrounded by a two-dot dashed line is implemented in the ASIC 603. As is apparent from FIG. 7, the ASIC 603 is responsible for the functions of the sliding mode control calculation unit 39, the control quantity estimation unit 23, the state quantity estimation unit 25, and the synthesizing unit 26. To the contrary, in FIG. 7, a range surrounded by a thick dotted line is implemented when the MPU 601 executes a program. As is apparent from FIG. 7, the MPU 601 is responsible for the functions of the PID control calculation unit 36, the target value calculation unit 35, and the preprocessing calculation unit 38.

The reason why the MPU 601 and the ASIC 603 share the feedback control is that the update period of the information processed in the portion implemented by the ASIC 603 is shorter than that of the information processed in the portion implemented by the MPU 601.

The preprocessing calculation unit 38 is also executed every time the target value calculation unit 35 updates the target value, and the latest register setting value is set in the register area of the ASIC 603. The preprocessing calculation unit 38 performs calculation for managing, as parameter values, only during the calculation period of the PID control calculation unit 36, some of variable values that change moment by moment in calculation of the phase switchover line executed by the sliding mode control calculation unit 39 or estimation calculation of the state quantity estimation unit 25. Execution of all the feedback control by the ASIC leads to increasing the size of the integrated circuit, and there is a lack of flexibility and versatility of processing. Thus, in this embodiment, the calculation accuracy and the circuit scale are compromised, and the preprocessing calculation unit 38 of the MPU executes part of calculation at the update timing.

A control parameter to be used by the sliding mode control calculation unit 39 may be changed in accordance with the operation state of the carriage 3. In this case, based on the target value of the target value calculation unit 35, a section of one of an acceleration state, a constant velocity state, and a deceleration state, in which the carriage 3 is located is determined. By changing, for each section, the switchover coefficient to be used to calculate the phase switchover line, an appropriate switchover line according to a carriage operation condition may be selected to implement rapid convergence.

Therefore, according to the above-described embodiment, if the feedback control arrangement formed from the first and second control units is applied to carriage driving control of the printing apparatus, it is possible to suppress a velocity vibration that cannot be suppressed conventionally. In the parameter setting of the first control unit, the region where the vibration factor of the control target is coped with can be made small, a decrease in traceability of the feedback control can be minimized. As described above, according to this embodiment, since it is possible to achieve compatibility between traceability and vibration suppression of the carriage as the control target object of the feedback control, carriage driving control can be performed more precisely, thereby implementing high-quality image printing.

4. Explanation of Another Application Example of Feedback Control

The present invention is applicable to any control of moving an object by driving the motor, as described above. Therefore, the present invention is applicable to, for example, control of the scanner motor that moves the CCD sensor or the CIS of the scanner apparatus having a single function or the scanner unit of a multi-function printer (MFP).

To ensure the image reading performance, the scanner unit needs to acquire an image signal by matching the movement quantity of the scanner unit and the light source lighting timing of the CCD sensor or the CIS. Since the light source lighting timing generally assumes that the moving velocity of the scanner unit is constant, it is important to suppress the velocity vibration of the scanner unit. Therefore, since the vibration target to be suppressed is the moving velocity of the scanner unit, the combination of the state quantities of the velocity and the acceleration is applied to the above-described second control unit. Basically, control is performed with the same arrangement as the carriage control arrangement described with reference to FIG. 7.

This can suppress a micro-vibration at a high-frequency of the scanner unit, which cannot be suppressed by only the conventional control, and improve the feedback control traceability. As a result, high-quality image reading can be achieved.

The present invention is also applicable to conveyance roller driving control of the printing apparatus described with reference to FIGS. 5 and 6. The printing apparatus rotates the conveyance roller for each carriage scanning operation to intermittently convey the print medium. To suppress a conveyance quantity vibration at this time, feedback control according to the present invention can be applied. In this case, since the control target object is the conveyance quantity (position vibration) of the print medium, the rotation quantity and rotational velocity of the conveyance roller are respectively input as the first and second state quantities to the above-described second control unit.

This can implement more precise conveyance control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-087540, filed Apr. 27, 2018, which is hereby incorporated by reference herein in its entirety.

What is claimed is:

1. An electric apparatus for controlling movement of a target object, comprising:
a CPU;
an ASIC; and
a detector, controlled by the CPU, and configured to detect the movement of the target object, wherein
the CPU updates, at a first period, a first operation quantity for controlling the movement of the target object, based on a detection signal output from the detector,
the ASIC updates, at a second period shorter than the first period, a second operation quantity, different from the first operation quantity, for controlling a movement quantity smaller than that of the target object controlled by the first operation quantity, based on a detection signal output from the detector, and
the ASIC controls the movement of the target object based on a third operation quantity generated by synthesizing the first operation quantity and the second operation quantity.

2. The apparatus according to claim 1, wherein the second operation quantity is updated based on a first state quantity and a second state quantity obtained based on a detection signal output from the detector, and
the second state quantity is obtained by time differentiation of the first state quantity.

3. The apparatus according to claim 2, wherein a combination of the first state quantity and the second state quantity comprises one of a combination of a position and a velocity of the target object and a combination of a velocity and an acceleration of the target object.

4. The apparatus according to claim 3, wherein
in case of controlling a position vibration of the target object, the combination of the position and the velocity of the target object is selected as the combination of the first state quantity and the second state quantity, and
in case of controlling a velocity vibration of the target object, the combination of the velocity and the acceleration of the target object is selected as the combination of the first state quantity and the second state quantity.

5. The apparatus according to claim 2, wherein a two-dimensional space defined by two variables of the first state quantity and the second state quantity is divided into two spaces, and the sign of the second operation quantity is determined in accordance with which of the two divided spaces includes the first state quantity and the second state quantity.

6. The apparatus according to claim 1, wherein
the electric apparatus comprises a printing apparatus configured to print on a print medium by a printhead by reciprocally moving a carriage mounted with the printhead, and
the target object comprises the carriage.

7. The apparatus according to claim 6, wherein
the second operation quantity is updated based on a first state quantity and a second state quantity obtained based on the detection signal output from the detector,
the second state quantity is obtained by time differentiation of the first state quantity,
the first state quantity comprises a velocity of the carriage, and
the second state quantity comprises an acceleration of the carriage.

8. The apparatus according to claim 7, wherein
the detector includes an encoder sensor configured to detect a position of the carriage, and
the position of the carriage is estimated by counting a pulse signal of an encoder signal output from the encoder sensor, and a velocity of the carriage is estimated by measuring a pulse width of the pulse signal.

9. The apparatus according to claim 1, wherein
the electric apparatus comprises one of a scanner apparatus configured to read an image of an original by a scanner unit mounted with a CIS or a CCD sensor by moving the scanner unit, and a multi-function printer obtained by providing the scanner apparatus in a printing apparatus for printing on a print medium by a printhead by reciprocally moving a carriage mounted with the printhead, and
the target object comprises the scanner unit.

10. The apparatus according to claim 1, wherein control of the movement of the target object based on the third operation quantity is performed at least during a period of constant movement of the target object.

11. The apparatus according to claim 1, wherein the first operation quantity is calculated by PID control calculation, and
the second operation quantity is calculated by sliding mode control calculation.

12. A control method for an electric apparatus for controlling movement of a target object using a CPU and an ASIC, comprising:
detecting the movement of the target object by a detector controlled by the CPU;
updating, at a first period, by the CPU, a first operation quantity for controlling the movement of the target object, based on a detection signal output from the detector;
updating, at a second period shorter than the first period, by the ASIC, a second operation quantity, different from the first operation quantity, for controlling a movement quantity smaller than that of the target object controlled by the first operation quantity based on a detection signal output from the detector; and
controlling, by the ASIC, the movement of the target object based on a third operation quantity generated by synthesizing the first operation quantity and the second operation quantity.

* * * * *